(12) United States Patent
Pedraja

(10) Patent No.: US 7,837,456 B2
(45) Date of Patent: Nov. 23, 2010

(54) DOUGH STREAM BLOCKER

(75) Inventor: Remberto N. Pedraja, Glen Allen, VA (US)

(73) Assignee: AMF Automation Technologies, Inc., Richmond, VA (US)

( * ) Notice: Subject to any disclaimer, the term of this patent is extended or adjusted under 35 U.S.C. 154(b) by 488 days.

(21) Appl. No.: 11/870,501

(22) Filed: Oct. 11, 2007

(65) Prior Publication Data

US 2009/0142441 A1  Jun. 4, 2009

(51) Int. Cl.
*B28B 17/00* (2006.01)
*B28B 13/00* (2006.01)

(52) U.S. Cl. .................. 425/192 R; 425/464; 425/238; 425/225; 426/503

(58) Field of Classification Search ............. 425/192 R, 425/225, 464, 238; 426/503
See application file for complete search history.

(56) References Cited

U.S. PATENT DOCUMENTS

| | | | |
|---|---|---|---|
| 4,395,427 A * | 7/1983 | Fischer et al. | 426/231 |
| 5,270,070 A | 12/1993 | Campbell | |
| 5,283,074 A | 2/1994 | Campbell | |
| 5,356,652 A | 10/1994 | Campbell | |
| 5,897,203 A * | 4/1999 | Kock | 366/76.1 |

\* cited by examiner

*Primary Examiner*—Maria Veronica D Ewald
(74) *Attorney, Agent, or Firm*—Thomas, Kayden, Horstemeyer & Risley, LLP

(57) ABSTRACT

A dough stream blocker (10) is positioned in a dough forming apparatus for selectively opening or blocking the flow of dough through the channels of the assembly that lead to the dough cut off device. Slide valves (34) are rotated to present either a slide valve opening (36) or a slide valve closed body portion (38) that opens or closes the channels.

11 Claims, 3 Drawing Sheets

DOUGH STREAM BLOCKER

FIELD OF THE INVENTION

This invention concerns a dough handling apparatus for forming dough into separate parallel dough streams and cutting pieces of dough from the separate dough streams. More particularly, the invention concerns a dough stream blocker for selectively blocking the passages through the dough handling apparatus.

BACKGROUND OF THE INVENTION

In the processing of baker's dough, dough is usually made up by feeding raw dough and a liquid into a pressure pump, and the pump advances the dough through various stages toward an oven. For example, the dough from the pressure pump might pass through a developer that stretches the gluten of the dough, and then through a metering pump where the pressure of the dough is increased and stabilized. The dough passes from the metering pump through a scaling division manifold that divides the oncoming dough into several dough streams. The dough then passes through a cut-off device that cuts the oncoming dough streams into smaller pieces, the pieces being suitable for baking as biscuits, buns, hot dog buns, etc. Examples of some of these components are disclosed in U.S. Pat. Nos. 5,270,070, 5,356,652 and 5,283,074.

There are times when it is desirable to modify the number of oncoming dough steams when the desired end product is being changed. For example, the end product might be changed in shape from smaller biscuits to elongated hot dog buns, etc. The changing of the end product might require one or more of the dough streams to be terminated, leaving fewer dough streams that would likely be used for the larger or longer buns. In order to reduce the number of dough streams, some of the components of the equipment must be modified or replaced. For example, when the dough leaves the metering pump and advances to the scaling division manifold where the dough is formed into several dough streams, a substitute scaling division manifold might be required. This is likely to require a shut down of the dough processing equipment while scaling division manifold and possibly other components are replaced.

In some instances, it is possible to block a channel of the dough processing equipment by inserting a plug and then a fastener to hold the plug in place at the scaling division manifold. In other instances, the dough processing equipment might include rotary globe valves in the channels that are used to adjust the flow of dough streams through the equipment. It might be possible to completely close a globe valve to block one of the dough streams, whereby the valve can be rotated about 20 or 30 turns to completely block the channel. The valves of this type usually are not located in the most desirable positions in the dough processing path to close off dough streams and are not well suited for expediently blocking or opening a channel for the dough.

Another feature of the prior art is that the dough processing equipment must be cleaned at predetermined periods for sanitation purposes. A typical cleaning method includes the turbulent movement of water under pressure through the dough channels. This has the effect of urging the water against the inside surfaces of the equipment, usually forcing any residue of dough and condiments out of the equipment. However, when there are multiple channels formed by the equipment, it is difficult to raise the pressure of the water to an equal pressure through all of the channels.

It would be desirable to have a valve system that could expediently block and open a dough stream at the most desirable position along the dough processing line for modifying the number of dough streams produced by the system and for expediently and more thoroughly cleaning the equipment.

Accordingly, this invention is directed to the above noted problems and to solutions thereto.

SUMMARY OF THE INVENTION

Briefly described, the present invention comprises a method and apparatus for forming dough into separate parallel streams and cutting pieces of dough from the streams, with the improvement including a dough stream blocker that can selectively open and close the ports of the apparatus through which the dough streams pass.

The dough stream blocker may include an entry panel that includes a plurality of entry ports formed therethrough, with the entry ports each configured to receive one of the dough streams. A delivery panel includes a plurality of delivery ports formed therethrough, and each delivery port is in alignment with one of the entry ports. A slide valve may be positioned at each delivery port, and a valve operator is provided for moving the valves independently of the other valves into and out of a dough stream blocking relationship with respect to the delivery ports.

The dough stream blocker may also include a valve cavity formed between the entry panel and the delivery panel at each delivery port, with the slide valves being positioned in the cavities.

The slide valves may each comprise a flat plate design that defines a valve opening therethrough sized and shaped to correspond to the sizes and shapes of the delivery openings in the delivery panel and a closed body portion of a breadth larger than the delivery openings.

Each of the valve operators may be connected to one of the slide valves for moving the slide valves between positions in which the valve openings of the slide valves are in alignment with said entry ports and said delivery ports to allow flow of dough streams through the dough stream blocker, or in which the closed body portion of the slide valve is in alignment with the entry ports and the delivery ports to block the flow of dough through the dough stream blocker.

The slide valves may be substantially flat, of a thickness only slightly less than the valve cavities. With this shape the slide valves may be expediently slid from one side to the other side of the valve cavities while maintaining a close fit in the cavities, thereby exposing the delivery ports to either the valve opening or the closed body portion of the slide valve.

As the dough stream moves into the dough stream blocker against a closed valve, the force applied by the dough stream to the valve plate tends to press the valve plate against the edge of the delivery panel adjacent the delivery opening, thereby tending to seal the dough from further travel through the dough stream blocker.

Since the slide valve is rotatable within the valve cavity in a direction normal to the direction of force of the dough stream, the force of the oncoming dough stream against the slide valve is not likely to bind the slide valve in a static position within the valve cavity. Therefore, the slide valves can be operated as the rest of the system operates, as may be desired. For example, if the dough processing system is being changed downstream of the dough stream blocker, it is possible to open or close the slide valves of the dough stream blocker.

Other objects, features and advantages of this invention may be understood from reading the following specification, when taken in conjunction with the accompanying drawings.

DETAILED DESCRIPTION

Figure 1:
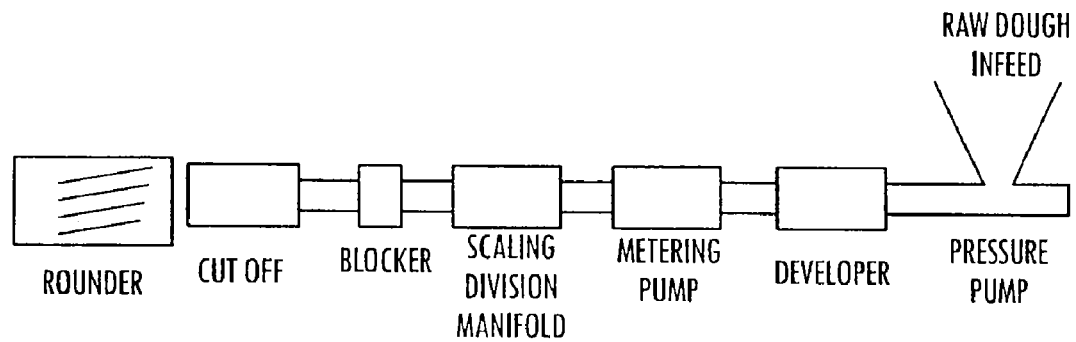
FIG. 1 is a block diagram of a typical dough processing system leading to an oven but now including a dough stream blocker which is positioned ahead of the dough cut-off device.
Figure 2:
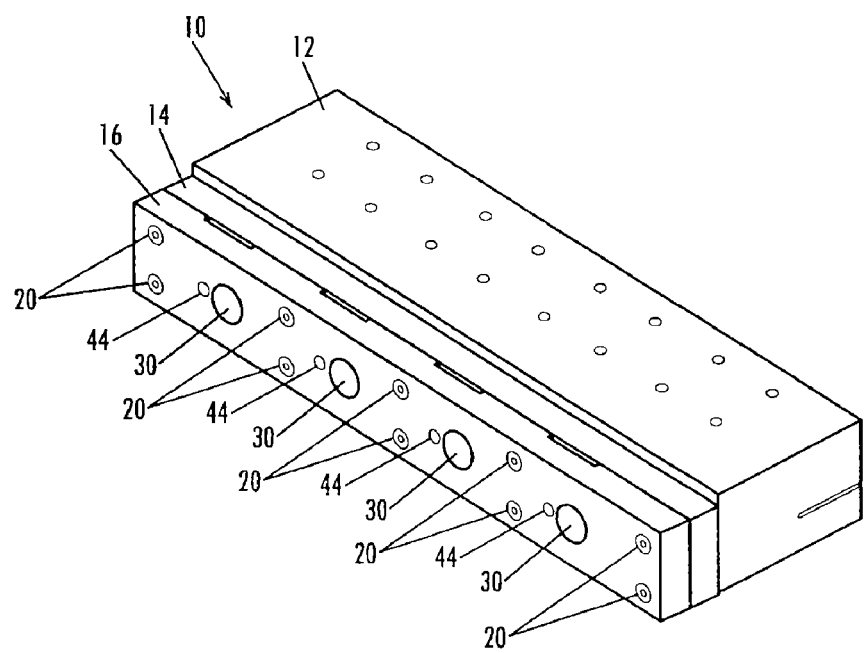
FIG. 2 is a perspective view of the dough stream blocker.
Figure 3:
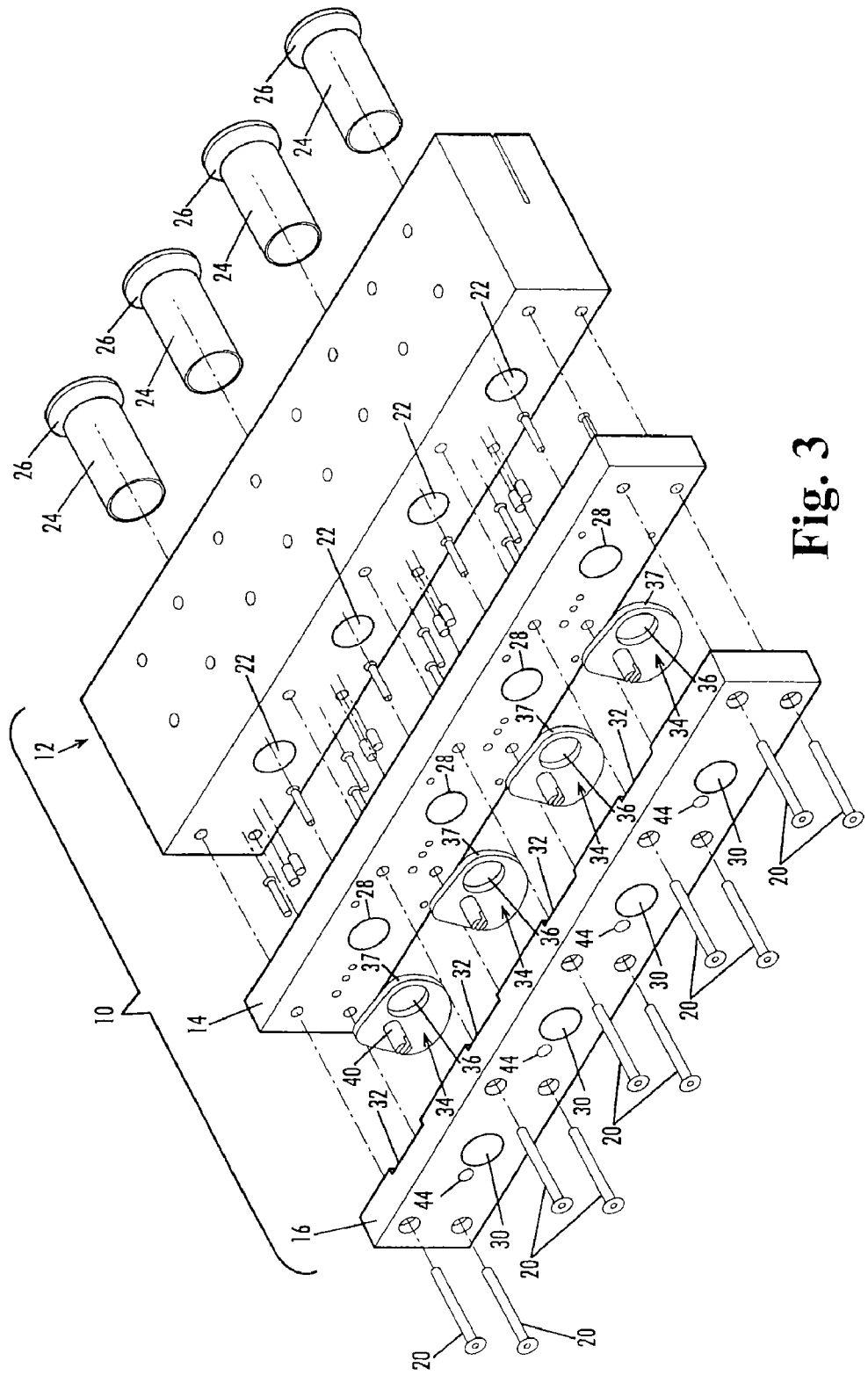
FIG. 3 is an expanded perspective view of the dough stream blocker.

Referring now in more detail to the drawings, in which like numerals indicate like parts throughout the several views, FIG. 2 shows the dough stream blocker 10 that includes mounting block 12, entry panel 14 and delivery panel 16. Mounting block 12, entry panel 14 and delivery panel 16 are each of rectangular shape, with the mounting block being more massive for the purpose of supporting the entry panel and delivery panel, and also for the purpose of receiving the oncoming dough streams. As shown in FIG. 3, the entry panel 14 and delivery panel 16 are mounted to the mounting block 12 by means of connector pins 20 and aligned pin openings. The entry panel and delivery panel are in face-to-face abutment with each other. If desired, a gasket may be positioned between the panels.

As shown in FIG. 3, mounting block 12 includes a plurality of dough stream passages 22 that extend completely through the mounting block for the purpose of receiving and passing dough streams therethrough. Entry sleeves 24 are telescopically inserted into the dough stream passages 22 and include rims 26 for connection to the next upstream device, such as a scaling division manifold. The entry sleeves can be made of various materials, such as polypropylene or nylon, or other suitable materials that have a relatively low coefficient of friction for passing dough streams. The mounting block, entry panel and delivery panel may be made of metal, such as aluminum, or of suitable nylon or of plastics, such as UHMW.

Entry panel 14 is a substantially flat, rectangular piece having opposed side surfaces that are flat but for the openings formed therein. Entry openings 28 are formed through the entry panel 14 and are sized and spaced to register with the passages 22 of the mounting block 12.

Delivery panel 16 is also of rectangular configuration, similar to the configuration of entry panel 14, and includes a plurality of delivery ports 30. The delivery ports 30 are of a size and shape substantially similar to the size and shape of the entry openings 28 of entry panel 14, and in axial alignment therewith. Delivery panel 16 further includes cavities 32 that face the entry panel 14.

Figure 4:
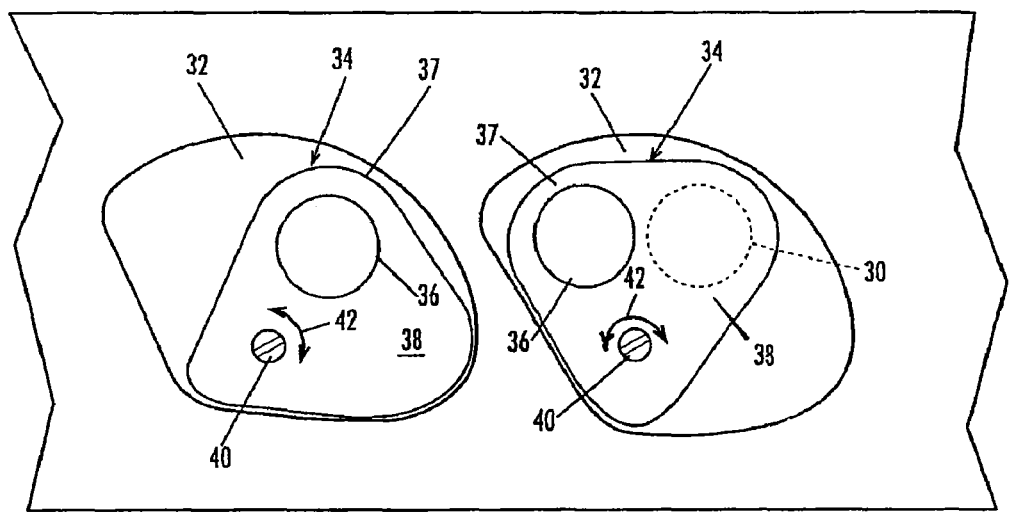
FIG. 4 is a detailed illustration of the rear face of the delivery panel, showing the slide valves in alternate positions and blocking or opening the delivery port.

As shown in FIGS. 3 and 4, slide valves 34 are located in the valve cavities 32. The slide valves are flat and of uniform thickness and are approximately heart shaped. Each slide valve includes a valve opening 36 and a closed body portion 38, and a valve operator 40. The slide valve has a rim 37 that forms the valve opening 36 and the opening is sized and shaped to register with and be coextensive with the entry openings 28 of entry panel 14 and the delivery openings 30 of the delivery panel 16. The slide valves move through an arc as indicated by arrows 42, so that the slide valve can move clockwise (FIG. 4) to locate its valve opening 36 in alignment with the entry port 28 and delivery port 30, or can move counter-clockwise to place the closed body portion 38 in registration with the entry ports 28 and delivery ports 30.

The slide valves 34 are received in the valve cavities 32 of delivery panel 16, as shown in FIG. 4. The breadth of the slide cavities 32 is greater than the breadth of the heart shaped slide valves 34, allowing room for the slide valves to pivot as shown in FIG. 4 and remain within the valve cavities.

When the dough stream blocker 10 is assembled, the mounting block, entry panel and delivery panel are all attached in a sandwiched relationship by means of connector pins 20. The valve operator 40 of each slide valve 34 will extend through a pivot pin opening 44 in delivery panel 16. The engagement of the valve operator 40 through the pivot pin opening 44 causes the valve operator to function as a pivot pin for the slide valve 34, as illustrated in FIG. 4. Moreover, the outwardly extending end portion of the valve operator includes a non-circular configuration, such as a slot for a flat plated screwdriver, or some other configuration compatible with turning the slide valve. The valve operator 40 may protrude from or remain recessed within the pivot pin opening 44, with its non-circular distal end being accessible with a tool for rotating the slide valve.

When the dough stream blocker 10 is placed in operation in a dough processing apparatus, the slide valves 34 may be moved through an arc by the external engagement of a valve operator 40 with a screw driver or other turning tool and turning the tool, thereby turning the slide valve. Typically, the delivery ports will be completely open or completely blocked by the slide valves. If fewer than all of the ports of the dough stream blocker are to pass dough steams in the dough forming process, one or more of the slide valves will be closed. For example, if the dough forming equipment is to make larger or longer products, some of the slide valves will be rotated to their closed positions to allow fewer dough streams to pass. This presents the closed body portion 38 between the entry ports 28 of the entry panel 14 and the delivery ports 30 of the delivery panel 16, effectively blocking the flow of dough therethrough.

The rim 37 of the slide valve opening 36 is the same width as the rest of the slide valve, so that when the valve opening 36 is aligned with the entry ports 28 and delivery ports 30, there will be no leakage of dough about the rim into the valve cavity.

The valve cavities 32 are disclosed as being formed in the delivery panel 16; however, the valve cavities may be formed in the entry panel 14 or an additional internal panel may be placed between the entry and delivery panels that includes the slide valve cavity.

When the equipment is to be cleaned for sanitation purposes, several of the slide valves may be closed and pressurized water entered in the system upstream of the dough stream blocker. With only one or just a few of the slide valves being open, the pressure of the water passing through the system may be raised for better cleaning action upstream of the dough stream blocker.

Although preferred embodiments of the invention have been disclosed in detail herein, it will be obvious to those skilled in the art that variations and modifications of the disclosed embodiments can be made without departing from the spirit and scope of the invention as set forth in the following claims.

The invention claimed is:

1. In an apparatus for forming dough into separate parallel dough streams and cutting pieces of dough from the separate dough streams, the improvement therein of:

a dough stream blocker for selectively blocking at least one of the dough streams while leaving another dough stream unblocked, comprising:

an entry panel including a plurality of entry ports formed therethrough with said entry ports each configured to receive one of the dough streams, a delivery panel including a plurality of delivery ports formed therethrough, each delivery port in axial alignment with one of said entry ports for receiving one of the dough streams, a slide valve positioned between each said entry port of said entry panel and said delivery port of said delivery panel and slidable in a plane normal to the dough streams into and out of a dough blocking relationship between said entry ports and said delivery ports, and a valve operator for each slide valve for moving each slide valve in a plane perpendicular to the dough streams and into and out of dough stream blocking relationship between an entry port and a delivery port, such that one or more dough streams are blocked when other dough streams are not blocked.

2. The apparatus of claim 1, wherein a valve cavity is formed between said entry panel and said delivery panel at each entry port, and said slide valves are positioned in said cavities.

3. The apparatus of claim 1, wherein said slide valves each define a valve opening therethrough sized and shaped corresponding to the sizes and shapes of said delivery openings and a closed body portion of a breadth larger than said delivery openings, and each said valve operator operatively connected to one of said slide valves for moving said slide valves between positions in which the valve opening of the slide valves are in alignment with said entry ports and said delivery ports to allow flow of dough streams through the dough stream blocker or in which the closed body portion of the slide valve is in alignment with said entry ports and said delivery ports to block the flow of dough through the dough stream blocker.

4. The apparatus of claim 1, and wherein each said valve operator comprises a pivot pin about which said slide valves pivot.

5. The apparatus of claim 4, wherein said pivot pins extend through said delivery panel.

6. The apparatus of claim 4, wherein said pivot pins each include a protruding portion that protrudes from said delivery panel, and said protruding portion includes a non-circular engagement member for moving said slide valve.

7. The apparatus of claim 1, and further including a mounting block defining distribution channels therethrough for directing dough streams to said entry ports of said entry panel, and connectors for connecting said mounting block, entry panel and delivery panel in abutting relationship.

8. A dough stream blocker comprising:

an entry panel including a plurality of entry ports formed therethrough, a delivery panel rigidly mounted to said entry panel and including a plurality of delivery ports formed therethrough, each said delivery port in axial alignment with one of said entry ports, said entry panel and said delivery panel having surfaces facing each other and defining therebetween a valve cavity extending about each of said aligned entry ports and delivery ports, a slide valve positioned in each valve cavity and movable in a plane normal to said delivery ports, said slide valves each being of a width smaller than the breadth of said valve cavity and defining a valve opening therethrough sized and shaped corresponding to the sizes and shapes of said delivery ports for opening said delivery ports and a closed body portion of a breadth at least as large as said delivery ports for closing said delivery ports, and a valve operator for each slide valve for selectively moving each slide valve in an arc to alternately move said valve openings and said closed body portions into and out of dough stream blocking relationship of each delivery port.

9. A dough stream blocker comprising:

an entry panel including a plurality of entry ports formed therethrough, a delivery panel including a plurality of delivery ports formed therethrough, each delivery port in alignment with one of said entry ports, said entry panel and said delivery panel having surfaces facing each other and defining therebetween a valve cavity extending about each said entry port and delivery port, a slide valve positioned in each valve cavity, said slide valves each defining a valve opening extending therethrough sized and shaped corresponding to the sizes and shapes of said delivery openings and a closed body portion of a breadth at least as large as said delivery openings, a valve operator for each slide valve for moving each slide valve in an arc in said valve cavities to alternately move said valve openings and said closed body portions of said slide valve into and out of dough stream blocking relationship of each delivery port, and wherein said valve operators extend from said slide valves through said delivery panel, such that as said valve operators rotate, the slide valves pivot about said valve operators.

10. The dough stream blocker of claim 9, wherein said slide valve cavities each being of a breadth limited to accommodate the slide valves when said slide valves are moved into and out of the blocking relationship with the delivery ports.

11. The dough stream blocker of claim 9, wherein said slide valve cavities are formed in said delivery panel.

* * * * *